US011549636B1

(12) United States Patent
Langner

(10) Patent No.: US 11,549,636 B1
(45) Date of Patent: Jan. 10, 2023

(54) SYSTEMS AND METHODS FOR A SELF-STABILIZING PLATFORM

(71) Applicant: Richard F. Langner, Phoenix, AZ (US)

(72) Inventor: Richard F. Langner, Phoenix, AZ (US)

(*) Notice: Subject to any disclaimer, the term of this patent is extended or adjusted under 35 U.S.C. 154(b) by 0 days.

(21) Appl. No.: 17/222,632

(22) Filed: Apr. 5, 2021

Related U.S. Application Data

(60) Provisional application No. 63/012,353, filed on Apr. 20, 2020.

(51) Int. Cl.
*F16M 11/04* (2006.01)
*F16M 11/26* (2006.01)

(52) U.S. Cl.
CPC ............. *F16M 11/04* (2013.01); *F16M 11/26* (2013.01); *F16M 2200/02* (2013.01)

(58) Field of Classification Search
CPC .... F16M 11/04; F16M 11/26; F16M 2200/02; A47B 91/16; A47C 7/008
See application file for complete search history.

(56) References Cited

U.S. PATENT DOCUMENTS

| | | |
|---|---|---|
| 2,795,892 A | 6/1957 | Lautenbacher |
| 2,805,034 A | 9/1957 | Wilson |
| 2,865,696 A | 12/1958 | Mooser |
| 3,117,392 A | 1/1964 | Junkuc |
| 3,572,262 A | 3/1971 | Jones |
| 3,722,847 A | 3/1973 | O'Connor |
| 3,794,141 A | 2/1974 | Sturm |
| 3,844,517 A | 10/1974 | Fraser |
| 3,880,388 A | 4/1975 | Beguin |
| 5,490,648 A | 2/1996 | Cullen |
| 6,378,656 B1 | 4/2002 | Kohler |
| 7,774,950 B2 | 8/2010 | Lasley |
| 8,870,134 B2 | 10/2014 | Catoni |
| 9,008,872 B2 | 4/2015 | Pflug |
| 9,592,908 B2 | 3/2017 | Gentry |
| 9,833,071 B2 | 12/2017 | Heyring |

(Continued)

FOREIGN PATENT DOCUMENTS

| | | | |
|---|---|---|---|
| CN | 20272791 | * | 2/2013 |
| CN | 106764281 A1 | * | 5/2017 |

(Continued)

*Primary Examiner* — Terrell L McKinnon
*Assistant Examiner* — Ding Y Tan
(74) *Attorney, Agent, or Firm* — Letham Law Firm PLLC; Lawrence Letham

(57) ABSTRACT

A platform to be used to secure objects for delivery by air. As a platform is lowered toward the ground, the legs of the platform touch the ground and interact with each other to stabilize the platform. A stable platform does not tip over. The platform may stabilize itself even when lowered onto uneven terrain.

As the platform is lowered, the legs, except the last leg, move upward or inside the body of the platform until the last leg touches the terrain. On uneven terrain, the legs of the platform move upward or inside different amounts, so the legs have different lengths. The last leg to touch locks the other legs so that they cannot move up or down thereby stabilizing the platform.

An incompressible material is used to detect when the last leg touches the terrain and to lock the other legs.

20 Claims, 7 Drawing Sheets

(56) References Cited

U.S. PATENT DOCUMENTS

| | | | |
|---|---|---|---|
| 9,883,744 B2 | 2/2018 | Macyszyn | |
| 9,909,709 B2 | 3/2018 | Pike | |
| 11,181,380 B2 * | 11/2021 | Khambati | ............. G01C 19/02 |
| 2003/0230681 A1 * | 12/2003 | Gwynneth | ............. A47B 91/16 |
| | | | 248/188.3 |
| 2014/0110541 A1 * | 4/2014 | Hoe | .......................... F16D 1/12 |
| | | | 248/160 |
| 2017/0295931 A1 * | 10/2017 | Macyszyn | ................. F16M 7/00 |

FOREIGN PATENT DOCUMENTS

| | | | | |
|---|---|---|---|---|
| DE | 102008063685 A1 * | 7/2009 | ............. | A47B 91/16 |
| ES | 1078379 U * | 1/2013 | | |
| ES | 2445496 A1 * | 3/2014 | | |
| FR | 3079866 A1 * | 10/2019 | | |
| GB | 394848 A * | 7/1933 | ............. | A47B 91/16 |
| GB | 1315833 | 5/1973 | | |
| GB | 1417248 | 12/1975 | | |
| GB | 2375343 * | 11/2002 | | |

\* cited by examiner

SYSTEMS AND METHODS FOR A SELF-STABILIZING PLATFORM

FIELD OF THE INVENTION

Embodiments of the present invention relate to platforms (e.g., deck, stage, stand, riser, raised surface, base) that are configured to self-stabilize.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
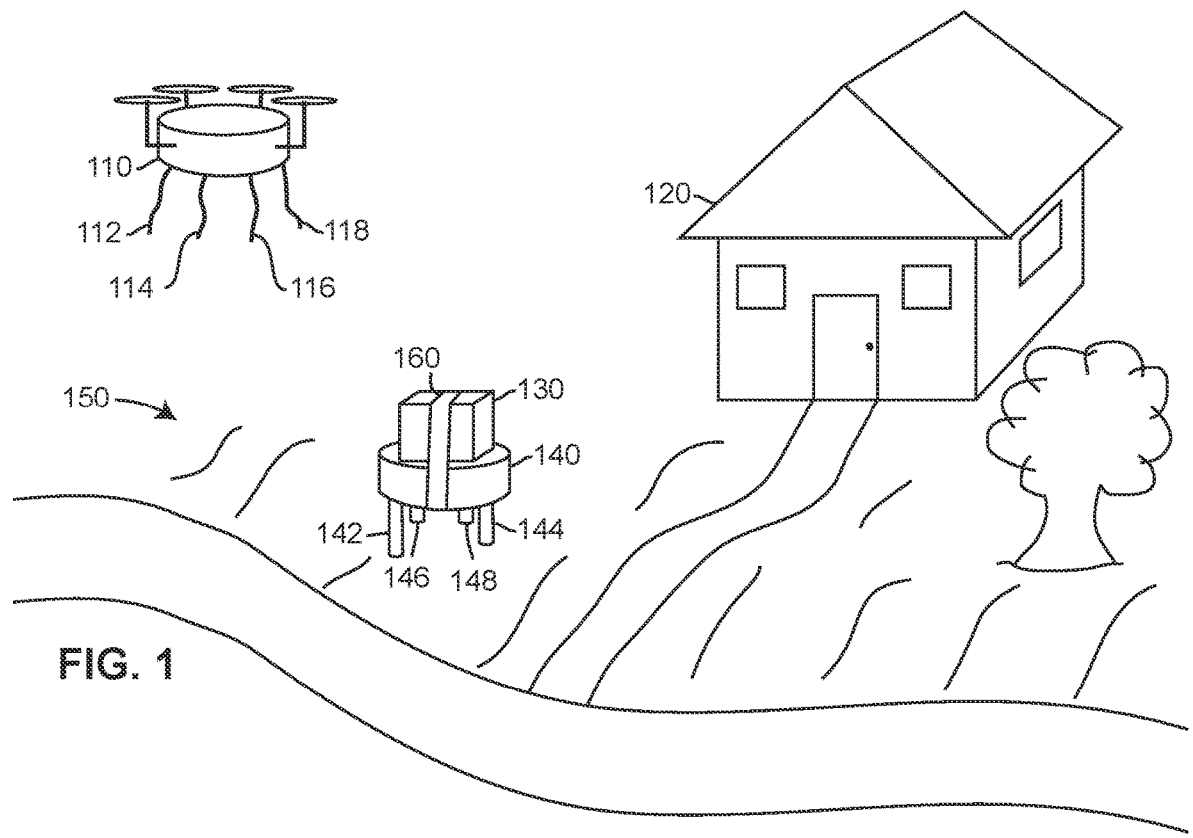
FIG. 1 is a diagram of a delivery by drone of a platform with a package to uneven ground.

A platform (e.g., deck, stage, stand, riser, raised surface, base) may be used to support an item (e.g., package, object). An item may rest on a surface of (e.g., top) or be bound to a platform. A platform may include legs. The legs of a platform may extend from the body of the platform. The legs of a platform may extend downward from the platform. An item may be delivered while on the platform. An item may be delivered via flight (e.g., by air) while on a platform.

A platform may be configured to stabilize itself as it is placed on the ground (e.g., terrain, surface). As a platform descends from the air to the ground, and the legs touch the ground, the platform may stabilize itself (e.g., self-stabilize). A platform may stabilize itself so that the platform does not tip over. A platform may be delivered by flight to an area where the ground is uneven. A platform may stabilize itself so that as it touches the ground it compensates for the uneven terrain so that it does not tip over. Because the platform is stable, an item on the platform is also stable.

For example, a drone may be used to deliver items. A drone may fly through the air with an item for delivery to a geographic location, such as a person's home. The terrain of the destination may not be known in advance. The terrain may be uneven. The item may need to be supported in some manner to be transported by drone. The item may be supported on a platform. As the drone descends toward the ground at the geographic location, the legs of the platform may be configured to cooperate to stabilize the platform. After the last leg of the platform touches the terrain, the platform is configured to be stable. Because the platform is stable, the platform will not tip over. Because the platform is stable, the item will not fall off of the platform. The drone releases the platform thereby delivering the item along with the platform to the geographic location. Once the drone has released the platform, it is free to fly away.

For example, the drone 110 may be used to deliver the package 130 to the house 120. The Package 130 may be secured by the strap 160 to the platform 140. The cables 112-118 are attached to the platform 140 to suspend the platform 140 and the package 130 below the drone 110 during flight. The cables 112-118 are configured to be released from the platform 140 after delivery of the platform 140 and the package 130.

The house 120 is surrounded by the sloping ground (e.g., terrain) 150. As the drone 110 descends from the air to deliver the package 130, the legs 142-148 contacted ground. As the legs 142-148 contacted ground, there configured to adjust to the unevenness of the sloping ground 150. The legs 142-148 contacted the ground 150 in such a manner, according to various aspects of the present disclosure, so as to stabilize the platform 140. Once the drone 110 has placed the platform 140 on the ground, the drone 110 may release the cables 112-118 from the platform 140 and fly away leaving the platform 140 and the package 130 behind. Because the platform 140 is configured to stabilized itself with respect to the sloping ground 150, the platform 140 and the package 130 are stable and do not roll down the sloping ground 150.

If the cables 112-118 hold the platform 140 even (e.g., level) with respect to the ground as the drone 110 descends, once the platform 140 self stabilizes, the platform 140 will remain level with respect to the ground.

In an embodiment, the platform 200 is a self-stabilizing platform. The platform 200 includes the body 210 that has the top 212, and the legs 220-226. As the drone (not shown) lowers the platform 200 to the ground, the legs 220-226 are configured to adjust (e.g., in length) to stabilize the platform 200 rests on the terrain 280 even though the terrain is uneven. The platform 200 is stable when the legs 220-226 rest on the ground and the platform 200 does not tip over. The legs 220-226 may adjust to stabilize the platform 200 even when an item, such as a package, rests on the top 212. If the top 212 is even (e.g., level, perpendicular to a force of gravity) to the terrain 280 as the platform 200 is lower to the ground and the legs 220-226 touch terrain 280, the top 212 will remain even with the ground after the platform 200 has self-stabilized.

As the platform 200 is lower to the ground, the length of the legs 220-226 adjust to compensate for the unevenness of the terrain 280. As the platform 200 is lowered (e.g., descends) to the ground, the legs 220-226 may not come into contact with the terrain 280 at the same time. The leg that is positioned over the highest part of the terrain 280 comes into contact with the terrain 280 first. The leg over the next to highest part of the terrain 280 comes into contact with the terrain 280 second, and so forth until the last leg touches the lowest part of the terrain.

Figure 2:
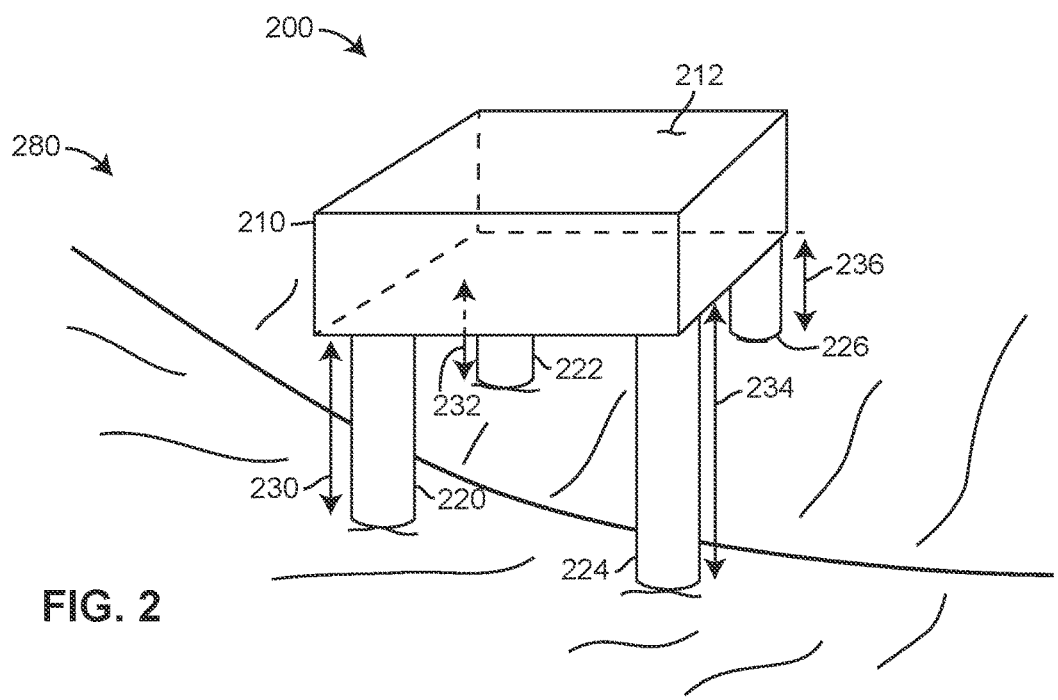
FIG. 2 is a diagram of a platform positioned on uneven ground.
Figure 3:
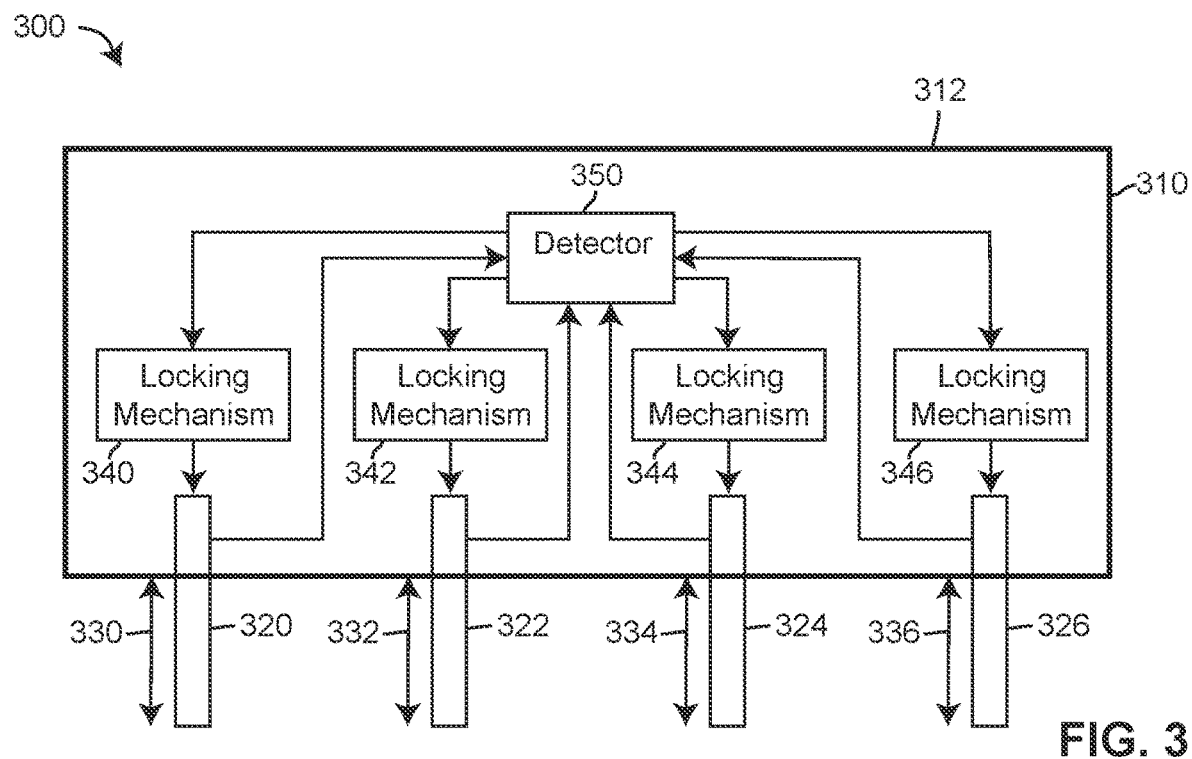
FIG. 3 is a block diagram of a platform according to various aspects of the present disclosure.

Referring to FIG. 2, the height of the terrain 280 below the leg 226 appears to be the highest, so the leg 226 will come into contact first with the terrain 280. The height of the terrain 280 below the leg 222 appears to be the next highest, so the leg 222 will be the second leg to contact the terrain 280. The height of the terrain 280 below the leg 220 appears to be the next highest, so the leg 220 will be the third leg to contact the terrain 280. The height of the terrain under the leg 224 appears to be the next highest, so the leg 224 will be the fourth leg to contact the terrain 280.

After a leg touches the terrain 280, it is configured to retract (e.g., move upward) into the body 210 until the last leg (e.g., 224) touches the terrain 280. With respect to FIG. 2, the legs 220, 222 and 226 each contact the terrain 280 before the leg 224. As the platform 200 is lowered to the ground, the legs 220, 222 and 226 contact the terrain and retract into the body 210 until the last leg, the leg 224, touches the terrain 280. When the last leg, the leg 224, touches the ground, the legs 220, 222 and 226 are locked in position so that the length 230, 232 and 236 do not change thereby maintaining the platform 200 stable.

If the platform 200 is placed on level ground, the length 230-236 of the legs 220-226 respectively will be about the same. However, in the example shown in FIG. 2, the length 234 is greater than the length 230 which is greater than the length 232 which is greater than the length 236. The length of a leg decreases as the leg is pushed into (e.g., enters) the body 210. The various lengths of the legs 220-226 compensate for the unevenness (e.g., slope) of the terrain 280 so that the platform 200 is stable and will not fall over. Further, if the top 212 is level with respect to the ground (e.g., perpendicular to the force of gravity) as the platform 200 is lowered to the ground, the legs 220-226 are configured to adjust their lengths to maintain the top 212 level with respect to the ground.

As the platform 200 is lifted (e.g., ascends) from the ground, the legs 220-226 begin to exit (e.g., further extend from) the body 210. When none of the legs 220-226 are touching the ground, the length 230-236 of legs 220-226 respectively are fully extended. In an embodiment, the legs 220-226, while fully extended, are the same length.

The end (e.g., top) of a leg does not need to be positioned inside a body of the platform. Legs may be coupled externally to the sides of a platform and move up and down with respect to the top of the platform to adjust their lengths.

A leg may be described as having an extended position and a weighted position. A leg that does not bear any of the weight of the platform (e.g., does not touch the ground) extends from the platform to its full extent and is thus in the extended position. In the extended position, the length of the leg is at its maximum.

A leg that bears weight (e.g., touches the ground), moves into the platform or upward with respect to the platform. A leg that bears weight moves out of the extended position. A leg that is not fully extended is out of the extended position and is in weighted position. In the weighted position, the length the leg extends from (e.g., with respect to) the body is less than the length the leg extends from the body while in the extended position. In the weighted position, the length of the leg (e.g., amount extended) may be a little bit less or a lot less than the length while in the extended position. In the weighted position, the leg may move into the platform or upward a little bit or almost an entire length of the leg.

Any leg that is in the weighted position extends from (e.g., exits) the body or moves downward with respect to the top of the platform when the platform 200 is lifted from the ground. When a leg completely moves off from (e.g., clears) the ground, it extends to its maximum length thereby leaving the weighted position and entering the extended position.

A resilient force may assist (e.g., aid) movement of a leg out of the body of a platform and/or downward with respect to the top of the platform. In other words, a resilient force may be configured to assist movement of the leg from the weighted position to the extended position. As long as a leg does not bear the weight of the platform, it remains fully extended. During flight, none of the legs should touch the ground, so there should be no weight on the legs and the legs should be fully extended.

As a platform is lowered toward the ground, the legs began to come into contact with the ground. If the ground is level and the drone positions the platform parallel to the ground, all the legs of the platform may come into contact with ground at about the same time. If the ground is not level, some legs will come into contact with ground before other legs come into contact with the ground as discussed above. The legs that first come in contact with ground retract (e.g., move upward) with respect to the body. When the last leg touches the ground, the legs cease to retract or move upward with respect to the body, thereby stabilizing the platform.

Regardless of the number of legs on the platform, as a platform is lowered to the ground, legs touch the ground and retract until the last leg touches the ground. When the last leg touches the ground (e.g., bears weight), all of the legs are locked (e.g., fixed, held) at their present length. In an embodiment, when the last leg touches the ground, all legs except the last leg are locked so that they neither move up or down. Although the last leg is not locked in position, its length does not change because the other legs are locked and it is touching the ground.

Because the length of the legs is configured to adjust to compensate for uneven terrain, the platform is stable upon being placed on the ground. If the top of the platform is level (e.g., perpendicular to a force of gravity) to the ground as it is being lowered, the legs touch the ground, stabilize the platform, and keeps the platform level (e.g., even) with respect to the ground.

A platform may include a detector that is configured to detect the position of each leg. A detector may detect when a leg is not in the extended position. A detector may detect when a leg is in the weighted position. A detector may detect when the last leg touches the ground. A detector may be configured to detect when to lock the legs.

As discussed above, each leg, upon touching the ground, moves into the body and/or upward as long as the platform is being lowered and as long as the last leg has not touched the ground. When the detector detects that the last leg has touched the ground (e.g., bears weight, moved out of the extended position), the detector is configured to activate one or more locking mechanisms that locks the legs in their present positions. When the locking mechanisms are activated, each leg is locked at its present distance of extension (e.g., length). Because the distance a leg extends relates to the unevenness of terrain, the different amounts of extension of each leg stabilize the platform. The legs remained locked at their present extension (e.g., length) until the weight is removed from one or more legs. In an embodiment, the legs are configured to remain locked until the last leg to touch is lifted from the ground.

In an embodiment, the platform 300 includes the body 310, the detector 350, the locking mechanisms 340-346, and the legs 320-326. The legs 320-326 extend from the body 310 the distance 330-336 respectively. The locking mechanism 340-346 are configured to cooperate with the leg 320-326 respectively to the lock the leg 320-326. While the legs 320-326 do not bear weight and the locking mechanisms 340-346 are not locked, the leg 320-326 may extend a maximum length (e.g., be in the extended position).

The detector 350 is configured to detect a position of each leg 320-326. The detector 350 may detect whether the legs 320-326 are in an extended position or a weighted position. The detector 350 is configured to detect when the last leg of the legs 320-326 touches the ground. The detector 350 may detect movement of the legs 320-326. The detector 350 may detect whether or not the legs 320-326 bear weight (e.g., touch the ground, leg in weighted position). The detector 350 may detect when one or more legs 320-326 are fully extended from the body 310 (e.g., leg in extended position).

Movement of a leg into the weighted position indicates that the leg has touched the ground and bears at least a part of the weight of the platform 300. An indication that a leg bears weight is an indication that the leg has touched the ground.

Movement of a leg out of the body 310 is an indication that weight is being removed from that leg. Weight may be removed from one or more legs as the platform 300 is lifted from the ground. As the platform 300 is lifted from the ground, a leg is configured to extend or more fully extend from the body 310. When the platform 300 is lifted from the ground (e.g., highest part of the ground) a distance that is greater than the length of a fully extended leg, all legs fully extend from the body 310. A leg that is fully extended from the body 310 indicates that the leg bears no weight. A resilient force (e.g., spring) may assist (e.g., force, move) the legs 320-326 from a weighted position to an extended position.

The detector 350 is configured to detect when all but one leg bears weight. The detector 350 may detect when a last leg begins to bear weight. Upon detecting that a last leg begins to bear weight, the detector 350 is configured to activate the locking mechanisms 340-346 to lock the legs 320-326 at their current length. In an embodiment, the locking mechanisms 340-346 are configured to lock all legs except the last leg to bear weight. When a leg is locked at its current length, the leg may no longer move into (e.g., up) or out of (e.g., down from) the body 310. When the locking mechanism 340-346 are activated, the length of each leg 320-326 remains at the length that it was at when the locking mechanisms 340-346 were activated.

When the detector 350 detects that the last leg no longer bears weight, the detector 350 is configured to deactivate the locking mechanisms 340-346. A resilient force may assist (e.g., aid) movement of a locking mechanism from an engaged (e.g., locked) position into a disengaged (e.g., unlocked) position. Deactivating a locking mechanism frees a leg so that it may move.

A locking mechanism is configured to move between a locked state and an unlocked state. A locking mechanism is configured to cooperate with a leg to move the locking mechanism between an engaged state and a disengaged state. While in the locked state, a locking mechanism is configured to cooperate (e.g., interfere) with a leg to limit (e.g., stop) movement of the leg. A locking mechanism, while in the locked state, may prohibit a leg from moving into (e.g., up) or out of (e.g., down from) the body 310. While in an unlocked state, a locking mechanism is configured to not restrict (e.g., interfere with) movement of a leg. While the locking mechanism is in an unlocked state, the leg that cooperates with the locking mechanism may move into or out of the body 310. While a locking mechanism is unlocked, movement of a leg into or out of the body 310 may depend on whether or not the leg touches the ground.

A locking mechanism may cooperate with one or more legs to lock the one or more leg at a present length. A locking mechanism may cooperate with one or more legs to disengage from the one or more legs to cease locking the one or more legs. A locking mechanism may use any structure suitable for interfering with movement of a leg for locking a leg. A locking mechanism may cease interfering with movement of a leg to unlock the leg.

A locking mechanism may be mechanical. A locking mechanism may use a magnetic field for interfering with movement of the leg. A locking mechanism may be configured to cooperate with a detector to lock a leg. A locking mechanism may be configured to cooperate with a detector to unlock a leg. Cooperation between a locking mechanism and a detector may be mechanical, electrical, and or electromechanical.

In an embodiment, a locking mechanism is configured to physically contact a leg to interfere with movement of the leg to lock the leg. The locking mechanism may cease to physically contact the leg to cease interfering with movement of the leg to unlock the leg. In another embodiment, a locking mechanism is configured to provide a strong magnetic field to lock a leg. The strong magnetic field may force the leg against the magnet and/or a structure proximate to the leg to interfere with movement of the leg to lock the leg. The locking mechanism ceases to provide the strong magnetic field to unlock the leg. The absence of the magnetic field may release the leg from contact against the magnet and/or the structure proximate to the leg to cease to interfere with movement of the leg to unlock the leg.

The platform 400 is a system configured to detect when the last leg bears weight (e.g., touches the ground) and for locking all legs, except the last leg, when the last leg bears weight. The platform 400 includes the chamber 410, the legs 432-434, the locking mechanisms 440-444, the incompressible material 420, and the housing 450. The housing 450 may include a surface (e.g., top) for supporting an item (e.g., package). The chamber 410, the locking mechanisms 440-444, and at least a portion of the legs 430-434 are positioned inside the housing 450. The chamber 410 has an internal volume. In an embodiment, the internal volume of the chamber 410 is fixed. The incompressible material 420 is positioned in the chamber 410. The incompressible material 420 occupies a portion of the volume of the chamber 410. The locking mechanisms 440-444 are configured to cooperate (e.g., interface, operate) with the chamber 410 and the incompressible material 420. The legs 430-434 are configured to cooperate with the locking mechanisms 440-444. The chamber 410, the incompressible material 420, the locking mechanisms 440-444, and the legs 430-434 are configured to cooperate with each other to perform the functions of a detector as discussed above.

While no leg of the legs 430-434 bears weight (e.g., touches the ground), the legs 430-434 extend from the housing 450 to their maximum length of extension (e.g., extended position). When the leg is extended to its maximum length, the locking mechanism that associates (e.g., cooperates) with the leg is configured to detect that the leg is fully extended. The locking mechanism transmits the information that the leg is fully extended to the incompressible material 420. A locking mechanism may transmit the information that a leg is fully extended by its position with respect to the incompressible material 420.

For example, when a leg is fully extended, the associated locking mechanism may move to disengaged position (e.g., a first position). In an embodiment, when the leg is fully extended, the leg that is configured to cooperate with that locking mechanism does not contact the locking mechanism thereby allowing the locking mechanism to move to the disengaged position.

When the leg is not fully extended, which means that the leg bears weight (e.g., touches the ground), the locking mechanism associated with that leg may move out of the disengaged position. A locking mechanism that is not in the disengaged position may be described as being in the engaged position (e.g., second position). In an embodiment, when a leg is not fully extended (e.g., in the weighted position), the leg is configured to contact the locking mechanism to move the locking mechanism. A leg may contact a locking mechanism to move the locking mechanism out of the disengaged position. A leg may contact a locking mechanism to move the locking mechanism into the engaged position. A leg may contact a locking mechanism to move the leg partially into the engaged position or fully into the engaged position.

Each locking mechanism may move or be moved between a disengaged position and an engaged position independent of all other locking mechanisms.

In an embodiment, while in the engaged position, a locking mechanism may move a little or a lot. As discussed below, when the leg that is not the last leg is weighted, the associated locking mechanism moves out of the disengaged position and moves a first distance to enter the chamber and to displace a first amount of the internal volume of the chamber. When the leg that is the last leg is weighted, the associated locking mechanism moves out of the disengaged position and moves a second distance to enter the chamber to displace a second amount of the internal volume of the chamber. The first distance is more than the second distance. The first amount is greater than the second amount.

The extended position of a leg and the disengaged position of a locking mechanism are specific positions. In the extended position, a leg has a specific relationship to the associated locking mechanism which is in the disengaged position. In an embodiment, a leg in the extended position is physically separate from the cooperating locking mechanism which is in the disengaged position. In another embodiment, a leg in the extended position physically contacts the cooperating locking mechanism, but does not apply a force sufficient to the locking mechanism to move the locking mechanism out of the disengaged position.

The weighted position and the engaged position start at a specific point and extend along a range of distances. For example, as a platform descends toward the ground, a leg may touch the ground and retract into the body a little or a lot. Regardless of whether the leg retracts a little or a lot, it has exited the extended position and entered the weighted position. When a leg enters the weighted position, the locking mechanism that cooperates with the leg exits the disengaged position. Whether the locking mechanism moves a little or a lot, depending on the state of the incompressible material, it has exited the disengaged position and entered the engaged position.

While a locking mechanism is in the disengaged position, the locking mechanism interacts less (e.g., interaction at a first level, displacement of a first amount) with the volume of the chamber and with the incompressible material 420 then while the locking mechanism is in the engaged position (e.g., interaction at a second level, displacement of a second amount). The position (e.g., disengaged, engaged) of the locking mechanism informs the incompressible material 420 as to the state (e.g., status, position, extended, weighted) of the leg associated with the locking mechanism.

For example, a locking mechanism in the disengaged position may displace (e.g., fill) the internal volume of the chamber 410 a first amount (e.g., volume). A locking mechanism in the disengaged position may move the incompressible material 420 a first amount (e.g., distance, volume). A locking mechanism in the engaged position may displace the internal volume of the chamber 410 a second amount (e.g., volume). A locking mechanism in the engaged position may move the incompressible material 420 a second amount (e.g., distance, volume). The second amount is greater than the first amount. The first amount may be zero in which the locking mechanism does not displace the volume of the chamber 410 or the incompressible material 420 at all or very little. While the locking mechanism is in the engaged position, the locking mechanism displaces the internal volume of the chamber 410 and the incompressible material 420 the second amount which is greater than the first amount.

With respect to displacement of incompressible material, the incompressible material is positioned in a chamber and cannot leave the chamber. The chamber has a fixed internal volume. However, a locking mechanism may enter the chamber and fill some of the space (e.g., volume) inside the chamber. When a locking mechanism fills some of the volume inside the chamber, the locking mechanism leaves less volume inside the chamber to be occupied by the incompressible material. As a locking mechanism moves or moves further into the chamber, it may displace (e.g., moves, pushes aside) the incompressible material that was in the space that is now occupied by the locking mechanism.

Displacement can be explained in terms of a beach ball in a swimming pool. When the swimmer holds the beach ball over the surface of the pool, the beach ball has not displaced any of the water in the pool. When the swimmer pushes the beach ball into the water, the beach ball fills (e.g., occupies, displaces) some of the internal volume of the pool leaving less volume to be occupied by the water. As a result, the level of the water in the pool rises to compensate. The beach ball has filled some the internal volume of the pool and displaced some of the water. This is analogous to a locking mechanism entering a chamber. The volume of the locking mechanism displaces a portion of the volume inside the chamber so that it cannot be occupied by the incompressible material. The locking mechanism, by displacing some of the internal volume of the chamber, has also displaced some of the incompressible material. The incompressible material redistributes to compensate for the reduced volume inside the chamber.

Figure 4:
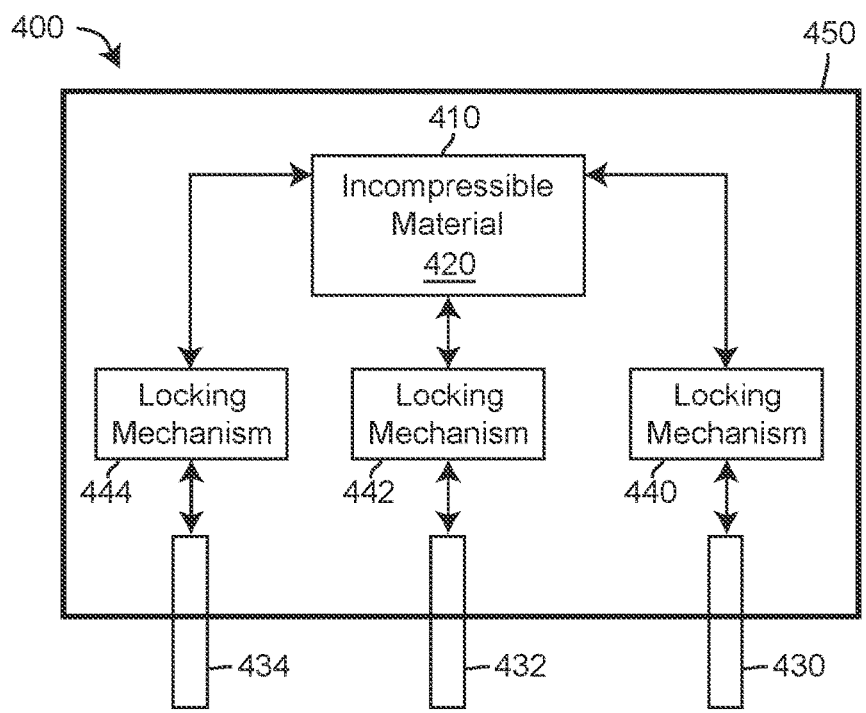
FIG. 4 is a block diagram of an example embodiment of a platform according to various aspects of the present disclosure.

Referring again to FIG. 4, the displacement of the incompressible material 420 increases with each locking mechanism 440-444 that moves from the disengaged position to the engaged position. As each locking mechanism moves from the disengaged position to the engaged position, at least a portion of the locking mechanism enters the chamber 410 thereby filling some of the internal volume of the chamber 410 and leaving less volume to be occupied by the incompressible material 420. Because the amount of the internal volume of the chamber 410 filled by locking mechanisms increases with each locking mechanism that moves from the disengaged position to the engaged position, the incompressible material 420 may detect, in cooperation with the internal volume of the chamber 410, when all locking mechanisms but one locking mechanism are in the engaged position. When all legs but one leg are weighted, all locking mechanisms but one locking mechanism are positioned at least partially inside the chamber 410.

When the last leg touches the ground, so that it bears weight, the associated locking mechanism, the last locking mechanism, moves out of the disengaged position to the engaged position. The movement of the locking mechanism from the disengaged position to the engaged position begins to displace additional volume in the chamber 410. The incompressible material 420 detects movement of the last locking mechanism and the displacement caused by the last locking mechanism as it attempts to move from the disengaged position to the engaged position.

Responsive to detecting movement of the last locking mechanism out of the disengaged position, the incompressible material is configured to apply a force to all locking mechanisms except the last locking mechanism to hold (e.g., lock) all legs except the last leg immobile. Legs that are held immobile cannot further extend from or retract into the housing 450.

The incompressible material 420 holds all of the locking mechanisms except the last in the engaged position until the leg that was last to touch the ground (e.g., last to bear weight) ceases to touch the ground (e.g., be weighted). When the last leg to touch the ground leaves the ground, the associated locking mechanism (e.g., the last locking mechanism) moves to from the engaged position to the disengaged position, thereby informing the incompressible material that the other locking mechanisms may be unlocked so that they and their associated legs may move.

Accordingly, the incompressible material 420 is configured to detect when the last leg is weighted. Further, the incompressible material 420 is configured to lock all legs but the last leg. The incompressible material is configured to cooperate with the locking mechanisms 440-444 to detect when the last leg is weighted and to lock all legs except the last leg. The legs 430-433 are configured to cooperate with the locking mechanisms 440-444 respectively to move the locking mechanisms 440-444 out of the disengaged position into the engaged position. The legs 430-434 are configured to cooperate with the locking mechanisms 440-444 respectively to release the locking mechanisms 440-440 so that the locking mechanisms 440-444 may move from the engaged position to the disengaged position.

An example of the cooperation (e.g., interaction) between an incompressible material, a chamber, and locking mechanisms is shown in FIGS. 5-8. As discussed above, the legs also interact with the locking mechanisms which in turn interact with the incompressible material, but the legs have been omitted from FIGS. 5-8 for the purpose of clarity.

In an embodiment, the legs are physically separate from the locking mechanisms when the legs are fully extended. When weighted, the legs may move from the extended position to the weighted position to contact the locking mechanisms to cooperate (e.g., interact) with the locking mechanisms. In an embodiment, each one leg interacts with a respective one locking mechanism. The embodiment may include a plurality of legs and a plurality of locking mechanisms that cooperate in a one-to-one correspondence.

In another embodiment, while the legs are in the fully extended position, the legs contact the locking mechanisms, but do not apply a force sufficient on the locking mechanisms to move the locking mechanisms out of the disengaged position. Only once a leg moves out of the fully extended position, does the leg apply sufficient force to the locking mechanism to move the locking mechanism out of the disengaged position. In another embodiment, one leg may interact with two or more locking mechanisms.

The structure shown in FIGS. 5-8 include the chamber 510, the incompressible material 520, and the locking mechanisms 540-544. The chamber 510 has an internal volume. The incompressible material 520 is positioned in the chamber 510 and fills a portion of the internal volume of the chamber 510. The incompressible material 520 is contained by the chamber 510. The incompressible material 520 does not exit the chamber 510. In the event that the incompressible material 520 is a liquid, the locking mechanisms 540-544 may include seals for sealing the openings where they enter the chamber 510. The chamber 510 includes the inner wall 512. The inner wall 512 may apply a force on the incompressible material 520. At times, as discussed below, there is space inside the chamber 510 where the incompressible material 520 is not positioned.

As will be explained below, the locking mechanisms 540-544 may move between a disengaged position and an engaged position. A locking mechanism may be in a disengaged position only when the leg associated with the locking mechanism is in its extended position. When a leg is in the weighted position, the associated locking mechanism cannot be in the disengaged position.

Figure 5:
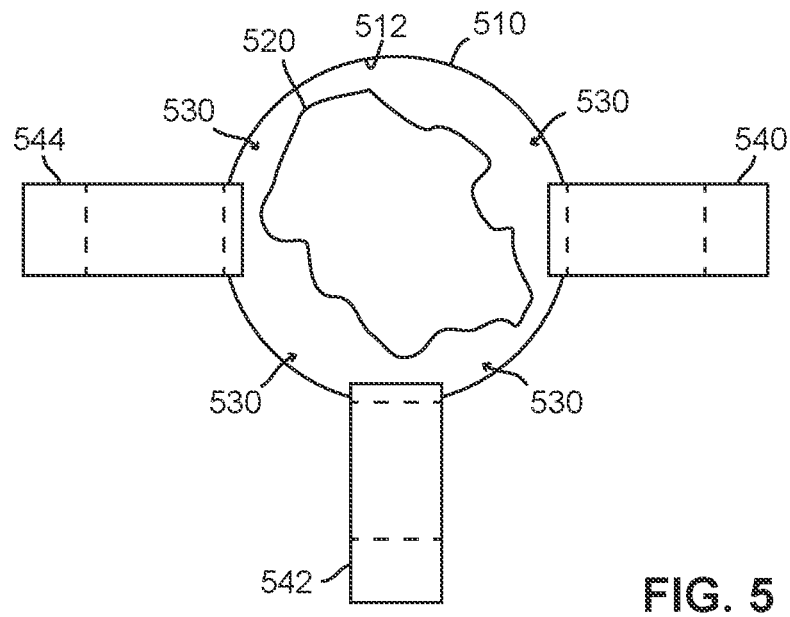
FIGS. 5-8 are diagrams of the cooperation between locking mechanisms, incompressible material, and a chamber.

The situation when all legs are fully extended (e.g., not touching the ground, not bearing weight, in the extended position) is shown in FIG. 5. While all legs are fully extended, the locking mechanisms 540-544 are in the disengaged position. In the disengaged position, only a portion of the locking mechanisms 540-544 are positioned inside the chamber 510. In another embodiment, the locking mechanisms 540-544 are positioned outside the chamber 510 while in the disengaged position. The locking mechanisms 540-544 enter the chamber 510 only upon entering the engaged position.

While the locking mechanisms 540-544 are in the disengaged position, the incompressible material 520 does not fill the inner volume of the chamber 510 to capacity. There is space inside the chamber 510 that is not occupied by the incompressible material 520. While the locking mechanisms 540-544 are in the disengaged position, the locking mechanisms 540-544 do not fill very much of the volume of the chamber 510 or displace any or very much of the incompressible material 520. While the locking mechanisms 540-544 are in the disengaged position, the incompressible material 520 does not exert a force on the locking mechanisms 540-544 or on the inner wall 512.

Figure 6:
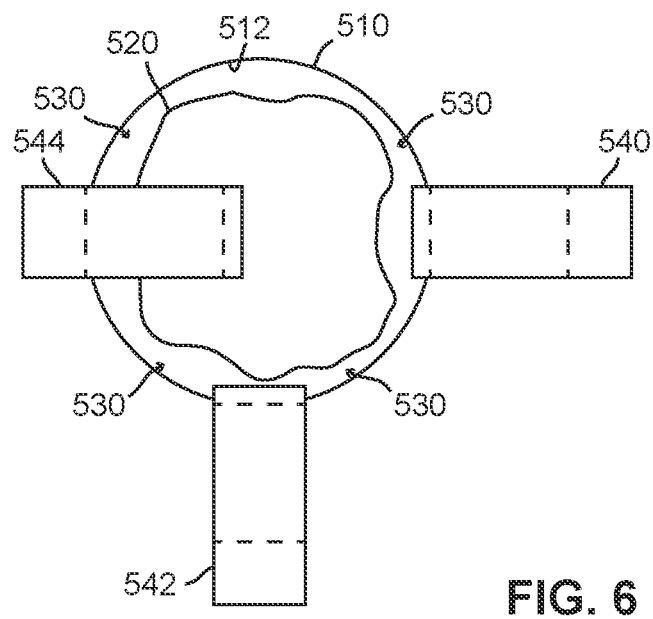

When one of the legs begins to bear weight (e.g., touches the ground), the locking mechanism associated with that leg moves into the engaged position. In FIG. 6, the leg associated with the locking mechanism 544 has begun to bear weight and the locking mechanism 544 has moved to the engaged position. In the engaged position more (e.g., a greater volume) of the locking mechanism 544 has entered into the chamber 510.

Although FIGS. 5-8 are shown only in two dimensions, the chamber 510, the incompressible material 520, and the locking mechanisms 540-544 are three-dimensional structures. The chamber 510 has a fixed volume. The incompressible material 520 has a fixed volume. The incompressible material 520 is also incompressible, so its fixed volume cannot decrease as a result of force (e.g., pressure).

As the locking mechanism 544 moves from the disengaged position to the engaged position, it more fully enters the chamber 510 thereby occupying (e.g., displacing, filling) some of the volume inside the chamber 510. The portion of the volume of the chamber 510 that is occupied by the locking mechanism 544 cannot be occupied by the incompressible material 520, so while the locking mechanism 544 is in the engaged position, there is less volume in the chamber 510 that may be occupied by the incompressible material 520. As locking mechanism 544 more fully enters (e.g., fills) the chamber 510, the locking mechanism 544 may exerted a force on the incompressible material 520 to move it out of the way (e.g., displace it). Responsive to the force, the incompressible material 520 moves around locking mechanism 544 and possibly closer to the inner wall 512 and the other locking mechanisms 540 and 542. The incompressible material 520 moves to accommodate the decrease in available volume by redistributing inside the chamber 510. As shown in FIG. 6, the locking mechanism 544 displaces some of the internal volume of the chamber 510 and the incompressible material 520.

Figure 7:
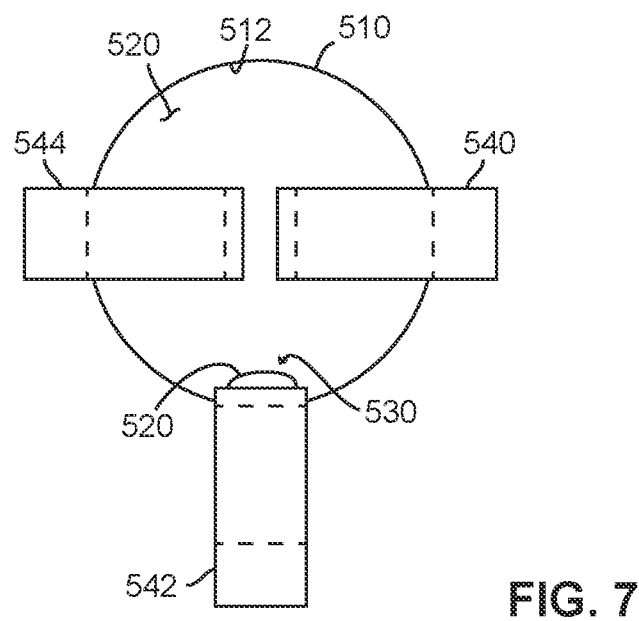

In FIG. 7, the leg associated with the locking mechanism 540 has begun to bear weight, while the leg associated with the locking mechanism 544 continues to bear weight. Because the leg associated with the locking mechanism 540 has begun to bear weight, the locking mechanism 540 moves from the disengaged position into the engaged position. In the engaged position, the locking mechanism 540 more fully enters the chamber 510 thereby occupying some of the volume inside the chamber 510. Meanwhile, the locking mechanism 544 continues to occupy volume inside the chamber 510.

As the locking mechanism 544 moves from the disengaged position into the engaged position, the locking mechanism 544 exerts a force on the incompressible material 520 to move the incompressible material 520 out of its way. Responsive to the force (e.g., movement) of the locking mechanism 540, the incompressible material 520 moves around the locking mechanism 540 and closer to the inner wall 512. Because the locking mechanism 540 is also a three-dimensional structure, while in the engaged position, the locking mechanism 540 occupies some of the volume of the chamber 510 thereby leaving less volume for the incompressible material 520 to fill. The incompressible material 520 adjusts to the reduced volume inside the chamber 510 by redistributing itself inside the chamber 510.

While the locking mechanisms 540 and 544 are in the engaged position and the locking mechanism 542 is not in the engaged position, there is enough space left (e.g., remaining) in the chamber 510 that the incompressible material 520 may be displaced a little bit more before it cannot be further displaced.

While the locking mechanism 540 and 544 are in the engaged position and displacing some of the volume of the chamber 510, the incompressible material 520 does not exert of force on the locking mechanism 540 or the locking mechanism 544 because there is still space (e.g., 530) inside of the chamber 510 that is not occupied by the incompressible material 520.

Each time a locking mechanism moves from the disengaged position to the engaged position, the incompressible material 520 redistributes and the amount of free (e.g., unoccupied) volume (e.g., free space 530) inside the chamber 510 is reduced. Because the locking mechanism 540 is associated with the leg that is the second to last leg to touch the ground, when the incompressible material 520 redistributes only a limited amount of free space 530 remains inside the chamber 510.

The situation illustrated in FIG. 7 shows the chamber 510, the incompressible material 520 and the locking mechanisms 540-544 just before the last leg bears weight. The incompressible material 520 has redistributed around inside the chamber 510 as the locking mechanisms 540 and 544 have displaced volume in the chamber 510. At this point, the incompressible material 520 fills almost all of the unoccupied volume inside the chamber 510 leaving very little free space 530. Depending on the type of material used for the incompressible material 520, even in the situation shown in FIG. 7, there may be interstitial space between whatever material comprises the incompressible material 520. However, the incompressible material 520 has almost reached the point at which it can yield no further volume when the locking mechanism 542 attempts to enter the chamber 510.

Also, in the situation illustrated in FIG. 7, the incompressible material 520 is not exerting any force on the locking mechanisms 540-544. The locking mechanisms 540 and 544 have exerted a force on the incompressible material 520 as they have entered the chamber 510 (see FIGS. 5-6), but only sufficient force to move the incompressible material 520 out of the way. Once the locking mechanisms 540 and 542 are fully inserted into the chamber 510, see FIG. 7, the incompressible material exerts no force on the locking mechanisms 540 and 544 because there is still free space 530 that could be occupied by the incompressible material 520.

As the last leg begins to bear weight, the locking mechanism 542, referred to as the last locking mechanism because it cooperates with the last leg, moves out of the disengaged position. When the locking mechanism 542 moves out of the disengaged position, it is in the engaged position, but as will be seen the locking mechanism 542 does not move very far into the chamber 510 while in the engaged position. Even though the locking mechanism 542 is in the engaged position, the locking mechanism 542 may not fully enter the chamber 510 or enter the chamber 510 as much as the locking mechanisms 540 and 544. Even if the locking mechanism 542 does not fully enter the chamber 510, when the leg associated with the locking mechanism 542 bears weight, the locking mechanism 542 moves out of the disengaged position and begins to displace the incompressible material 520 inside the chamber 510.

Figure 8:
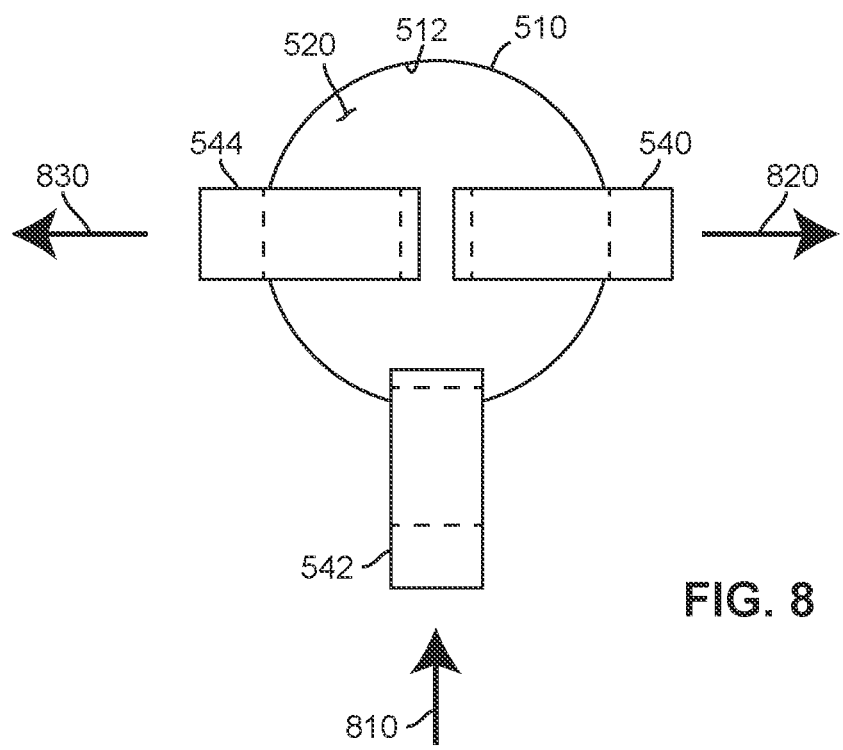

As the locking mechanism 542 begins to enter the chamber 510, see FIG. 8, it may displace a small amount of the incompressible material 520, but even before the locking mechanism 542 reaches the full extent of the engaged position, the incompressible material 520 has completely filled the free space in the chamber 510 and cannot be displaced further to accommodate further insertion of the locking mechanism 542. As the locking mechanism 542 enters the chamber 510, the incompressible material 520 is pressed against the inner wall 512 and against the portions of the locking mechanisms 540-544 that are inside the chamber 510. The incompressible material 520 has nowhere to go. The incompressible material 520 is incompressible and cannot be displaced any further. There is no room in the chamber 510 for the locking mechanism 542 to move fully into the engaged position inside the chamber 510.

Because the incompressible material 520 is incompressible, any force provided by the locking mechanism 542 (e.g., force 810) is transferred to the inner wall 512 and to the locking mechanisms 540 and 544 by the incompressible material 520. The incompressible material 520 transforms any inward force provided by the locking mechanism 542 (e.g., force 810) into an outward force (e.g., force 830, force 820) on the locking mechanisms 540 and 544.

The outward force on the locking mechanisms 540 and 544, shown as the forces 820 and 830 respectively in FIG. 8, forces the locking mechanisms 540 and 544 outward and against their respective legs. The outward force provided by the locking mechanisms 540 and 542 act to lock the legs associated with the locking mechanisms 540 and 544 in their current position so they cannot extend or retract further.

As shown in the progression of FIG. 5 to FIG. 8, the incompressible material 520 is configured to detect when all locking mechanisms but one locking mechanism are in the fully engaged position and when the last leg is weighted. The incompressible material can translate the force provided by the weight on the last leg, via the locking mechanism associated with the last leg (e.g., last locking mechanism), into a force that can lock all legs but the last leg in their current position. In this embodiment, the incompressible material detects when the last leg touches the ground and provides a medium (e.g., conduit) for the force that locks all but the last leg into their present positions.

The sequence of FIGS. 5-8 shows that as the platform is placed on the ground, in this case on an uneven surface, the legs are pushed into the platform one by one until the last leg touches the ground and locks all of the other legs at their present length. Locking the legs when the last leg touches the ground enables the platform to stabilize itself. If the platform is lower to the ground so that the top of the platform is level to the ground (e.g., perpendicular to a force of gravity), the platform will remain stable and level as long as it is on the ground.

As the platform is raised from the ground, the weight (e.g., force) on the last leg is removed (e.g., released, halted), so the force (e.g., force 810) on the locking mechanism (e.g., 542) associated with the last leg (e.g., last locking mechanism) stops. Because the locking mechanism 542 no longer applies force on the incompressible material 520, the incompressible material 520 ceases to provide a force on the other locking mechanisms (540, 544) thereby unlocking the other legs. As the platform is further raised from the ground, the other legs extend from the platform until they reach their full extension (e.g., extended position) and their associated locking mechanisms (540, 544) move from the engaged position to the disengaged position.

The progression of FIGS. 5-8 in reverse shows the movement of the locking mechanisms as a platform is raised, the legs are unlocked, and the locking mechanisms move out of the chamber and back into the disengaged position. A resilient force may aid movement of the locking mechanisms from the engaged position to the disengaged position. A resilient force may aid movement of the legs from the weighted position to the extended position.

Incompressible material includes any material whose volume may be displaced and is substantially incompressible. Incompressible does not mean solid. An incompressible material may be made up of many incompressible particles. There may be interstitial spaces between the particles when the incompressible material fills the remaining volume in the chamber and can be displaced no further. Incompressible materials may include sand, clay, water, oil, and/or geometric objects of any shape, such as spheres (e.g., BBs such as for a BB gun), that are formed of incompressible materials (e.g., metal, wood, plastic).

The volume of the incompressible material in the chamber 510 is such that the incompressible material may be displaced by all but one locking mechanism. The volume of the incompressible material in the chamber 510 is such that when the locking mechanism associated with the last leg to be weighted begins to enter the chamber 510, there is no room left in the chamber 510 for the incompressible material to occupy, so the force provided by the last locking mechanism is translated by the inner walls of the chamber 510 and the incompressible material into a force that is exerted against all of the other locking mechanisms (e.g., all but last) to lock the other legs (e.g., all but last).

The chamber may have any shape and/or volume. The locking mechanisms may have any shape and/or volume. The volume of the chamber is described above with respect to the volume of the incompressible material and the volumes of the locking mechanisms.

Above, the interior volume of the chamber is described as being fixed. It is conceivable that the interior volume of the chamber may change as successive locking mechanisms enter into the chamber; however, when the last locking mechanism begins to enter into the chamber, the interior volume of the chamber should be at its maximum and the incompressible material should fill almost all of the empty space inside the chamber, so the last locking mechanism displaces the incompressible material to the point where it can be displaced no more.

Figure 9:
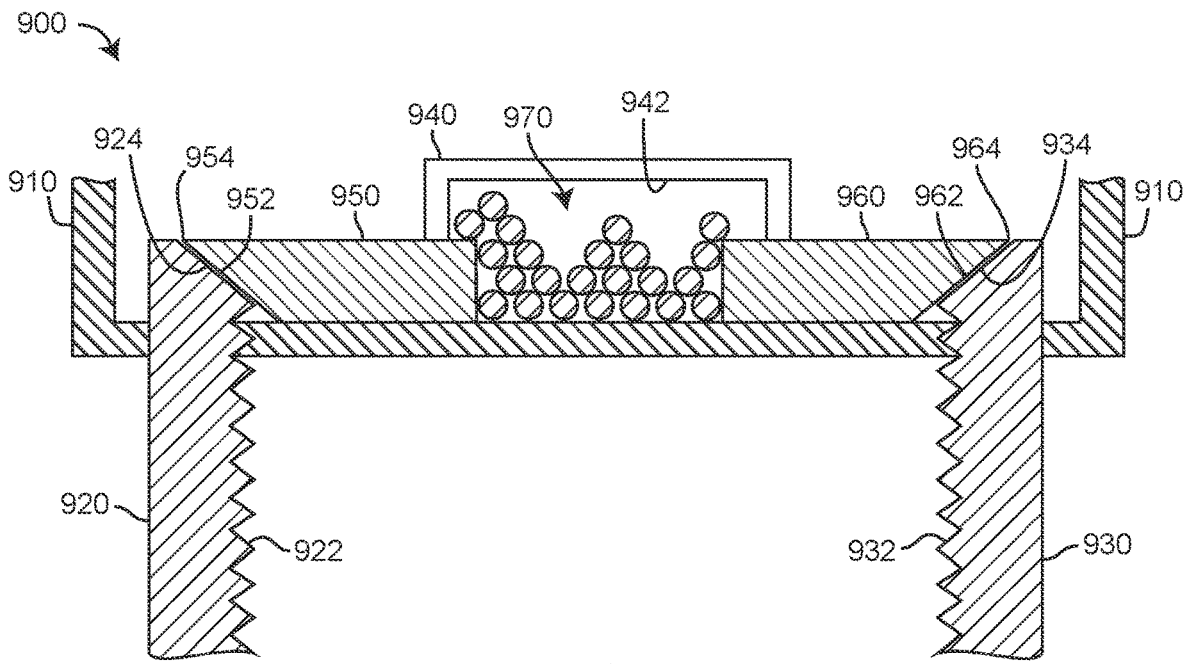
FIGS. 9-11 are diagrams of the cooperation between legs, locking mechanisms, and incompressible material, and a chamber in an embodiment.
Figure 10:
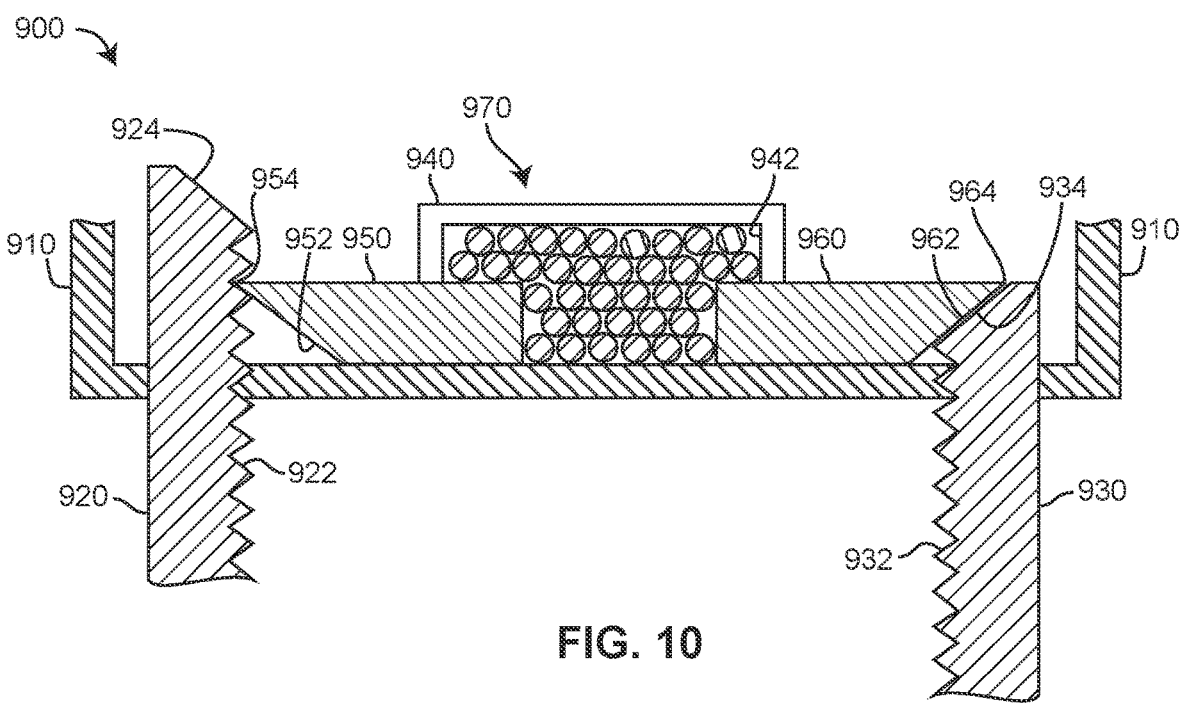
Figure 11:
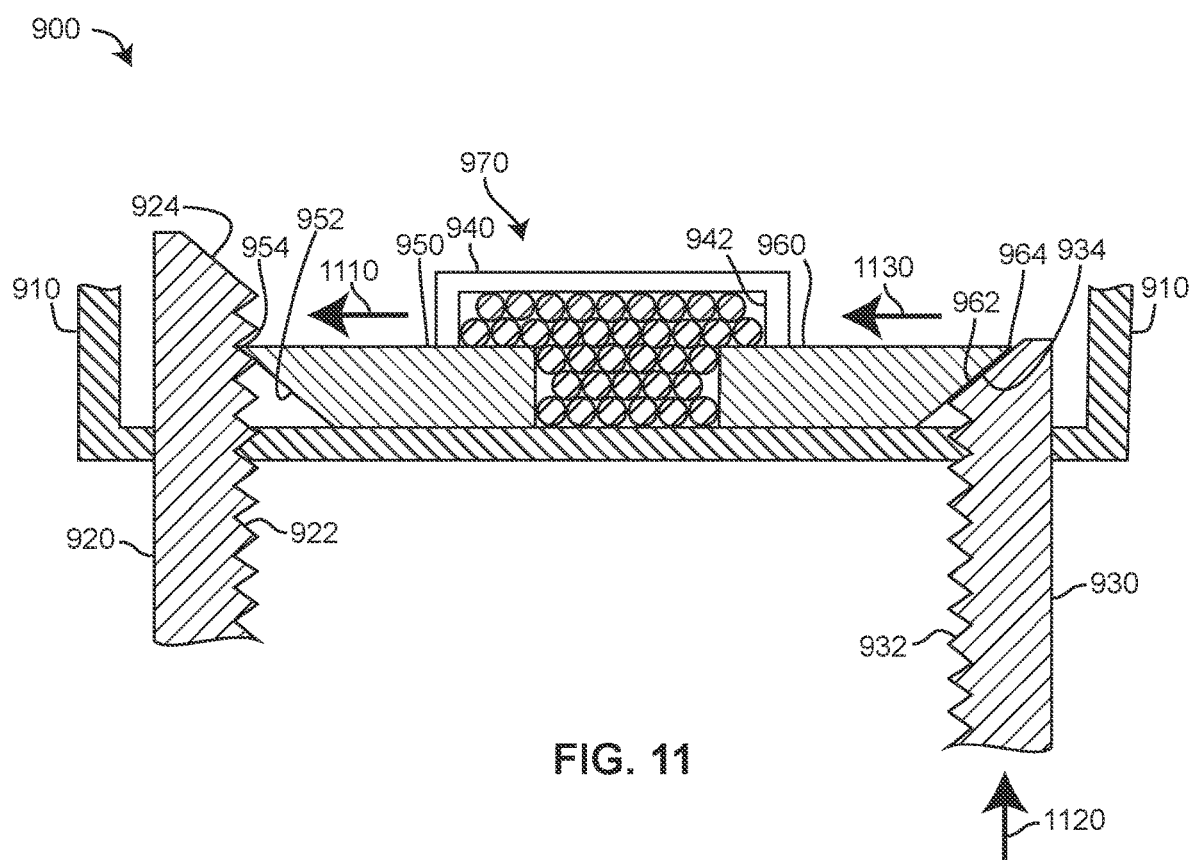
Figure 12:
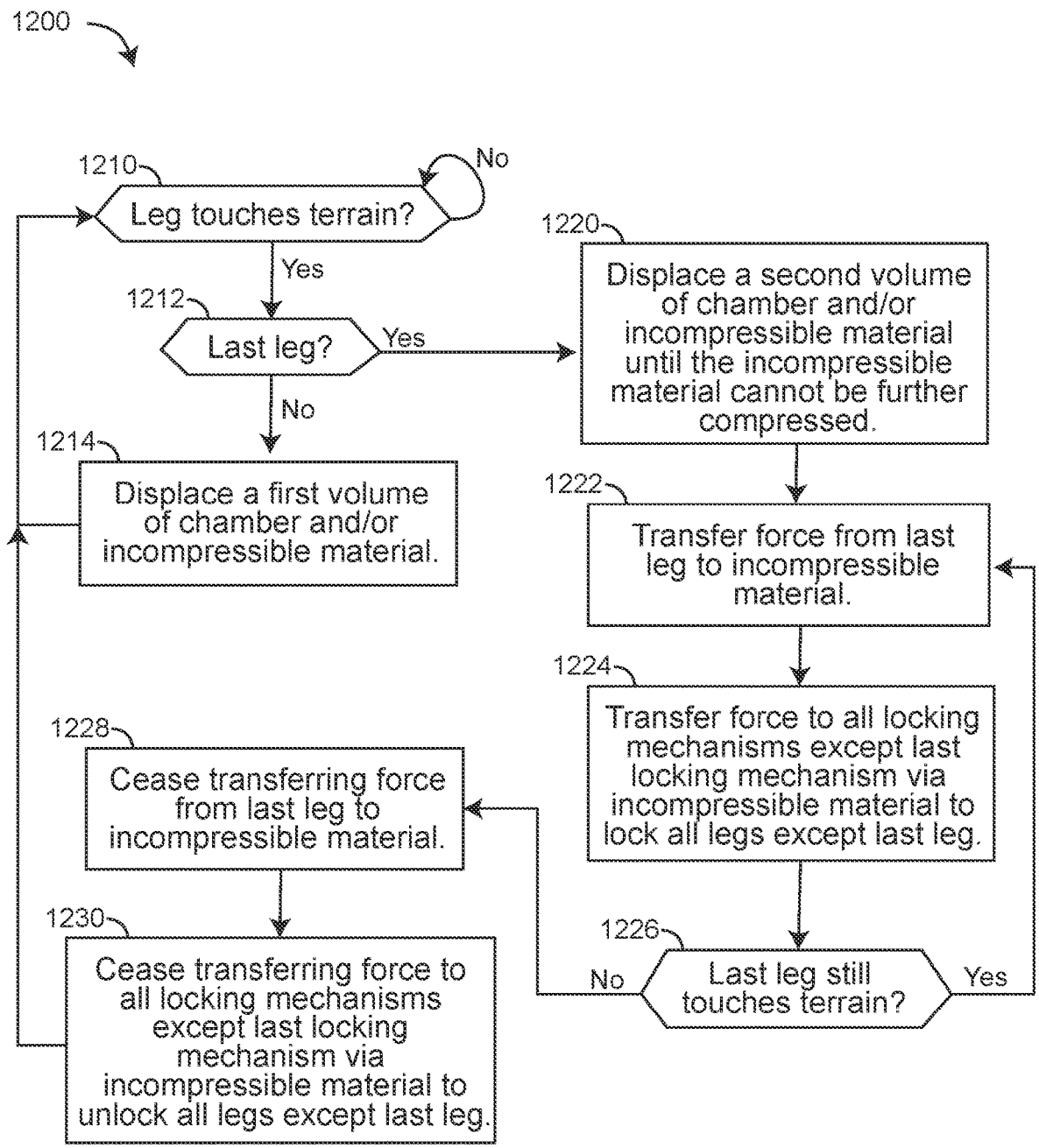
FIG. 12 is a diagram of a method performed by a platform.

The embodiment shown in FIGS. 9-11, further illustrates the interaction between legs, locking mechanisms, a chamber, and an incompressible material. The platform 900 may have three or more legs to be able to rest stably on the ground, but only the legs 920 and 930 and the locking mechanisms 950 and 960 are not shown for the purpose of clarity.

In FIG. 9, the leg 920 and leg 930 are extended from the housing (e.g., body) 910 of the platform 900 to their maximum extent. While the legs 920 and 930 are in the extended position, they do not engage (e.g., interact with, cooperate with) the locking mechanisms 950 and 960 respectively and the locking mechanisms 950 and 960 are in the disengaged position. The chamber 940 completely encloses the incompressible material 970.

The incompressible material 970 in this embodiment is formed of a plurality of round spheres. The round spheres are formed of an incompressible material. While the legs 920 and 930 are in the extended position, the spheres of the incompressible material 970 do not fill all of the empty space inside the chamber 940. As seen in FIG. 9, there is space between the spheres and above the spheres so that the spheres do not touch a lot of inner wall 942, at least not with any force. The spheres of the incompressible material 970 do not exert a force on the locking mechanisms 950 and 960.

In FIG. 10, the leg 920 has moved into the body 910 as a result of the leg 920 touching the ground. As the leg 920 moves into the body 910, the surface 924 of the leg 920 is configured to move upward to contact the surface 952 of the locking mechanism 950. As the surface 924 moves upward, the surface 952 is configured to slide against the surface 924 thereby forcing the locking mechanism 950 from the disengaged position into the engaged position.

The locking mechanism 950, as shown in FIG. 10, has moved to the fullest extent of the engaged position. As the leg 920 continues to move into the body 910, the tip 954 is configured to engage the teeth 922 of the leg 920. Movement of the locking mechanism 950 into the chamber 940 displaces some of the volume inside chamber 940 and the balls of the incompressible material 970. As shown in FIG. 10, while the locking mechanism 950 is in the engaged position, there is less room between the balls of the incompressible material 970 and the balls contact a greater proportion of the inner wall 942.

In FIG. 10, the incompressible material 970 fills almost all of the open space in the chamber 940 because the leg 920 is the second-to-last leg to touch the ground. Although there is some space between the balls of the incompressible material 970 and the inner wall 942, there is not much.

In FIG. 11, the leg 930 begins to bear weight (e.g., touches the ground). As the leg 930 moves upward into the body 910, the locking mechanism 960 exits (e.g., leaves) the disengaged position and enters the engaged position, but does not move to the full extent of the engaged position. As the leg 930 moves upward, the surface 934 begins to move against the surface 962 and to force the locking mechanism 960 into the chamber 940. In FIG. 11, the locking mechanism 960 has moved out of the disengaged position and into the engaged position, but not very far along in the engaged position. As the locking mechanism 960 moves into the chamber 940, the locking mechanism 960 displaces the remaining space between the balls of the incompressible material 970 and the inner wall 942. Because there is no remaining available space inside the chamber 940, the incompressible material 970 can no longer accommodate further displacement of its volume. The incompressible material 970 cannot accommodate any more volume of the locking mechanism 960 inside the chamber 940. Even though there are interstitial spaces between the balls of the incompressible material 970, the balls press against each other and against the inner wall 942 so no further displacement of the balls by the locking mechanism 960 is possible. The incompressible material cannot be further displaced.

Because the incompressible material 970 cannot accommodate the movement of the locking mechanism 960 to the full extent of the engaged position, the movement of the locking mechanism 960 into the chamber 940 is stopped by the incompressible material 970. The locking mechanism 960, as discussed above, has left the disengaged position and moved in to the engaged position but cannot move further into the engaged position because of the incompressible material 970. For reference, the locking mechanism 950 has reached the full extent of the engaged position by entering the chamber 940 as much as it has.

As is evident in FIG. 11, because the movement of the locking mechanism 960 into the chamber 940 has been stopped by the incompressible material 970, the tip 964 has not cleared the surface 934 to come into contact with the teeth 932. Because the tip 964 is not in contact with the teeth 932, the leg 930, the last leg to touch the ground, cannot be locked into position. In this embodiment, the last leg to touch terrain does not lock. The last leg provides a force that is transmitted through the incompressible material 970 to lock all of the other legs, except for the leg 930. Because the last leg is not locked, when the platform is lifted from the terrain, the last leg moves to the extended position, the associated locking mechanism moves to the disengaged position, and the force that locks the other legs ceases, so the other legs can also move to the extended position as the platform is further lifted from the terrain.

The weight on the leg 930 results in the force 1120 upward along the leg 930. The force 1120 is translated by the locking mechanism 960 into the force 1130. The force 1130 presses on the incompressible material 970. Because the incompressible material 970 cannot give way to the volume of the locking mechanism 960, the incompressible material 970 translates the force 1130 into the force 1110 on the locking mechanism 950 in addition to all other locking mechanisms that are not shown. The force 1110 forces the tip 954 into the teeth 922, thereby locking the leg 920 at its present length. While the leg 920 is locked, it cannot further move into the body 910 or out of the body 910. The other legs of the platform 900, other than the leg 930, are also locked thereby stabilizing the platform 900. The leg 920, and any other legs that are not shown, remains locked as long as there is weight on the leg 930.

When the platform 900 is lifted away from the ground, weight is removed from the leg 930, the leg 930 moves downward and enters the extended position. The force 1120 ceases. The surface 962 slides up the surface 934 thereby placing the locking mechanism 960 in the disengaged position. Because the locking mechanism 960 is in the disengaged position, the locking mechanism 960 ceases to provide the force 1130 to the incompressible material 970, so the pressure on the balls of the incompressible material 970 decreases allowing the balls to spread apart somewhat. As soon as the force 1130 ceases and the pressure (e.g., force) on the incompressible material 970 decreases, the force 1110 ceases thereby unlocking the leg 920.

As the platform 900 is further lifted away from the ground, the next-to-last leg (e.g., leg 920) begins to move out of the body 910. As the leg 920 moves out of the body 910, the locking mechanism 950 begins to move along the teeth 922 until the tip 954 reaches the beginning of the slope of the surface 924. As the platform 900 is further lifted from the ground and the leg 920 further extends from the body 910, the tip 954 slides up the surface 924 thereby moving the locking mechanism 950 from the engaged position to the disengaged position. As the locking mechanism 950 moves from the engaged position to the disengaged position, the locking mechanism 950 moves out, least partially, from the chamber 940 and the balls of the incompressible material 970 have more space between each other and from the inner wall 942.

When the legs of the platform 900 all leave the ground, all locking mechanisms are in the disengaged position and the balls of the incompressible material 970 are not pressed together or pressed against the inner wall 942. There is open space inside the chamber 940.

The legs of a platform may be weighted in any order. Any leg may be the last leg to touch the ground.

Method 1200 describes a method performed by a platform for locking the legs of the platform to hold the platform stable. A platform may use mechanical structure and operations to perform the method of 1200. Different embodiments of mechanical structures that perform method 1200 are discussed above. A platform may use electromechanical operations and components to perform method 1200.

In the step 1210, the platform determines whether any of the legs have touched the terrain (e.g., ground, surface). There may be a plurality of legs. In one embodiment, there are three or more legs. If none of the legs have touched the terrain (e.g., all legs in extended position) or an additional leg has not touched the terrain, the platform remains at the step 1210. When any leg or any additional leg touches the terrain, the platform moves to the step 1212 to determine whether leg that just touched the terrain is the last leg to touch the terrain. The term "last leg" means the numerically last leg of all of the legs of the platform. In other words, if the platform has three legs (e.g., 430, 432, 434), when two legs (e.g., 430, 432) touch the terrain, the remaining leg (e.g., 434) is the last leg. Depending on the terrain, any leg may be the last leg for each time the platform is placed on the terrain.

In step 1212, the platform determines whether the leg that just touched the terrain is the last leg to touch the terrain. If the leg that just touched is not the last leg, the platform moves to step 1214. If the leg that just touched is the last leg, the platform moves to step 1220.

In the step 1214, a first volume of the chamber and/or of the incompressible material is displaced. As described above, a locking mechanism may enter the chamber to displace volume inside the chamber. In the step 1214, a first volume of the volume inside the chamber is displaced by a locking mechanism. Depending on the volume of the incompressible material and its position inside the chamber, the locking mechanism may displace some of the volume of the incompressible material. Displacing the incompressible material may include pushing the incompressible material out of the way of the locking mechanism as it enters the chamber. In the step 1214, the locking mechanism may not contact the incompressible material to move it out of the way, but a portion of the internal volume of the chamber has been filled with the volume of the locking mechanism (e.g., first volume) thereby reducing the volume of the chamber that can be occupied by the incompressible material by the first volume. After the platform perform the step 1214, the platform returns to the step 1210.

Until the last leg touches the ground, the platform cycles through the steps 1210, 1212, and 1214 as each leg touches the terrain.

In the step 1220, the locking mechanism associated with the last leg enters the chamber. The locking mechanism may not be able to fully enter the chamber because it is the last locking mechanism to enter the chamber and most of the volume of the chamber is filled with the other locking mechanisms and the incompressible material. The last locking mechanism displaces a second volume of the interior volume of the chamber. The second volume is less than the first volume. Displacing the second volume brings the last locking mechanism into contact with the incompressible material in such a manner that the incompressible material cannot be further displaced. After the last locking mechanism enters the chamber, the volume inside the chamber is completely filled with the locking mechanisms and the incompressible material. There is no free space, ignoring interstitial space, inside the chamber. The platform moves from the step 1220 to the step 1222.

In step 1222, the last locking mechanism continues to press on incompressible material because of the weight on the last leg. Because the incompressible material cannot be displaced anymore, the force provided by the last leg to the last locking mechanism is applied (e.g., transferred) to the incompressible material. The force provided by the last leg is the force applied to the last leg as a result of touching the terrain. The platform moves from the step 1222 to the step 1224.

In the step 1224, the force that is applied on the incompressible material is transferred by the incompressible material to all of locking mechanisms, except the last locking mechanism, via the incompressible material in cooperation with an inner wall of the chamber. The force on all of the locking mechanisms, except for the last locking mechanism, forces the locking mechanisms against their respective legs. The force holds the legs in their present position and thereby locks the legs, all except the last leg, in their present position. As long as the force is transferred to all of locking mechanisms except the last locking mechanism, the legs remain locked in their present position. When a leg is locked, it cannot move. A locked leg cannot move up or down. Because all legs except for the last leg, are locked and the last leg cannot move further into the body of the platform, the legs are all in a fixed position (e.g., at a length) and stabilize the platform. The platform moves from the step 1224 to the step 1226.

In the step 1226, the platform determines whether the last leg is still touching the terrain. If the last leg is still touching the terrain, the platform moves back to the step 1222. In other words, if the last leg is still touching the terrain, the force on the last leg, the last locking mechanism, the incompressible material, and all of the locking mechanisms except the last locking mechanism is maintained (e.g., still present). As long as the force is maintained, the legs, except for the last leg, remain locked. If the last leg is no longer touching the terrain, the platform moves to the step 1228.

In the step 1228, the weight has been removed from the last leg because it no longer touches terrain. Since the weight of the last leg was translated into a force on the incompressible material, removing the weight from the last leg means that the force on the incompressible material from the last locking mechanism ceases. Accordingly, as soon the platform is lifted and the weight is removed from last leg, the force being transferred from the last leg to the incompressible material by the last locking mechanism ceases. The platform moves to the step 1230.

In the step 1230, because the force from the last leg is no longer being exerted on the incompressible material, the incompressible material can no longer transfer the force to all of the locking mechanisms except for the last locking mechanism. Accordingly, the force on all of the locking mechanisms, except the last locking mechanism, ceases. Because the force on all the locking mechanisms ceases, the legs are unlocked. The platform moves from the step 1232 to the step 1210.

The foregoing description discusses embodiments (e.g., embodiments), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that is not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. A platform for self-stabilizing, the platform comprising:
a housing;
a chamber having three openings and an internal volume;
an incompressible material positioned in the internal volume of the chamber, the chamber encloses the incompressible material whereby the incompressible material cannot exit the chamber;
a first locking mechanism, second locking mechanism and a third locking mechanism, each locking mechanism movably positioned in a respective opening of the chamber, a portion of each locking mechanism positioned in the internal volume of the chamber, each locking mechanism adapted to move between a disengaged position and an engaged position, each locking mechanism adapted to extend a first distance into the chamber while in the disengaged position thereby reducing the internal volume that can be occupied by the incompressible material by a first amount, each locking mechanism adapted to extend a second distance into the chamber while in the engaged position thereby reducing the internal volume that can be occupied by the incompressible material by a second amount, the second distance greater than the first distance, the second amount greater than the first amount;
a first leg, a second leg and a third leg, a portion of each leg positioned inside the housing, each leg configured to retract into and extend out of the housing, the first, the second and the third legs configured to cooperate with the first, the second and the third locking mechanisms respectively; wherein:
the third leg contacts a ground after the first leg and the second leg both contact a ground and while the first leg, the second leg and the third leg remain in contact with the ground:
(1) the first locking mechanism and the second locking mechanism are positioned in the engaged position;
(2) the first locking mechanism and the second locking mechanism respectively reduce the internal volume that can be occupied by the incompressible material by the second amount thereby leaving a third amount of the internal volume unoccupied by the incompressible material;
(3) the third amount is less than the second amount;
(4) the third locking mechanism is positioned out of the disengaged position, but is not fully positioned in the engaged position whereby the third locking mechanism extends a third distance into the internal volume of the chamber;
(5) the third locking mechanism reduces the internal volume that can be occupied by the incompressible material by the third amount whereby, the first, the second and the third locking mechanisms and the incompressible material fill the internal volume of the chamber;
(6) the third locking mechanism applies a force on the incompressible material;
(7) the incompressible material transfers the force to the first locking mechanism and the second locking mechanism;
(8) the force presses the first locking mechanism and the second locking mechanism against the first leg and the second leg respectively to hold immobile the first leg and the second leg with respect to the housing; and
(9) the third locking mechanism does not hold immobile the third leg with respect to the housing.

2. The platform of claim 1 wherein the incompressible material cannot exit the internal volume of the chamber via any of the three openings.

3. The platform of claim 1 wherein, a volume of the incompressible material is less than the internal volume of the chamber.

4. The platform of claim 1 wherein, while the first leg, the second leg and the third leg do not contact the ground, a sum of a first volume of the incompressible material and a second volume of the first locking mechanism, the second locking mechanism and the third locking mechanism positioned inside the internal volume of the chamber is less than the internal volume of the chamber.

5. The platform of claim 1 wherein, while the first leg, the second leg and the third leg all contact the ground, a sum of a first volume of the incompressible material and a second volume of the first locking mechanism, the second locking mechanism and the third locking mechanism positioned inside the internal volume of the chamber is equal to the internal volume of the chamber.

6. The platform of claim 1 wherein, while the first leg, the second leg and the third leg do not touch the ground:
the first locking mechanism, the second locking mechanism and the third locking mechanism are positioned in the disengaged position;
the first locking mechanism, the second locking mechanism and the third locking mechanism respectively reduce the internal volume that can be occupied by the incompressible material by the first amount whereby the first locking mechanism, the second locking mechanism and the third locking mechanism positioned in the internal volume of the chamber do not fill the internal volume; and
the first locking mechanism, the second locking mechanism and the third locking mechanism do not hold immobile the first leg, the second leg and the third leg with respect to the housing.

7. The platform of claim 1 wherein, a portion of the first locking mechanism, the second locking mechanism and the third locking mechanism respectively remains outside of the chamber while the first locking mechanism, the second locking mechanism and the third locking mechanism are positioned in either the disengaged position or the engaged position.

8. A platform for self-stabilizing, the platform comprising:
a housing;
a chamber having at least three openings and an internal volume;
an incompressible material positioned in the internal volume of the chamber, the chamber encloses the incompressible material whereby the incompressible material cannot not exit the chamber;
at least three locking mechanisms, one locking mechanism for each opening of the chamber, each locking mechanism movably positioned in a respective opening of the chamber, a portion of each locking mechanism positioned inside the internal volume of the chamber, each locking mechanism adapted to move between a disengaged position and an engaged position, each locking mechanism adapted to extend a first distance into the chamber while in the disengaged position thereby reducing the internal volume that can be occupied by the incompressible material by a first amount, each locking mechanism adapted to extend a second distance into the chamber while in the engaged position thereby reducing the internal volume that can be occupied by the incompressible material by a second amount, the second distance greater than the first distance, the second amount greater than the first amount, all locking mechanisms but one locking mechanism belong to a first group, the one locking mechanism belongs to a second group;
at least three legs, one leg for each locking mechanism, a portion of each leg positioned inside the housing, each leg configured to retract into and extend out of the housing, all legs but one leg belong to a third group, the one leg belongs to a fourth group, each leg of the third group configured to cooperate with one locking mechanism respectively of the first group, the one leg of the fourth group configured to cooperate with the one locking mechanism of the second group; wherein, the one leg of the fourth group contacts a ground after all of the legs of the third group contact the ground and while all of the at least three legs remain in contact with the ground:
(1) the locking mechanisms of the first group are positioned in the engaged position whereby each locking mechanism of the first group extends the second distance into the internal volume of the chamber respectively;
(2) the locking mechanisms of the first group respectively reduce the internal volume that can be occupied by the incompressible material by the second amount thereby leaving only a third amount of the internal volume unoccupied by the incompressible material;

(3) the third amount is less than the second amount;

(4) the one locking mechanism of the second group is positioned out of the disengaged position, but not fully positioned in the engaged position whereby the one locking mechanism of the second group extends a third distance into the internal volume of the chamber, the third distance is greater than the first distance, but less than the second distance;

(5) the one locking mechanism of the second group reduces the internal volume that can be occupied by the incompressible material by the third amount, whereby the locking mechanisms of the first group, the one locking mechanism of the second group and the incompressible material fill the internal volume of the chamber;

(6) the one locking mechanism of the second group applies a force on the incompressible material;

(7) the incompressible material transfers the force to the locking mechanisms of the first group;

(8) the force presses the locking mechanisms of the first group against the legs of the third group respectively to hold immobile the legs of the third group with respect to the housing; and (9) the one locking mechanism of the second group does not hold immobile the one leg of the fourth group with respect to the housing.

9. The platform of claim 8 wherein the incompressible material cannot exit the internal volume of the chamber via any of the at least three openings.

10. The platform of claim 8 wherein a volume of the incompressible material is less than the internal volume of the chamber.

11. The platform of claim 8 wherein, while the at least three legs do not contact the ground, a sum of a first volume of the incompressible material and a second volume of the at least three locking mechanisms positioned inside the internal volume of the chamber is less than the internal volume of the chamber.

12. The platform of claim 8 wherein, while the at least three legs all contact the ground, a sum of a first volume of the incompressible material and a second volume of the at least three locking mechanisms positioned inside the internal volume of the chamber is equal to the internal volume of the chamber.

13. The platform of claim 8 wherein, while none of the three legs touch the ground:

the at least three locking mechanisms are positioned in the disengaged position;

the portion of the at least three locking mechanisms positioned inside the internal volume of the chamber reduces the internal volume that can be occupied by the incompressible material by the first amount respectively;

the portion of the at least three locking mechanisms positioned inside the internal volume of the chamber and the incompressible material do not fill the internal volume of the chamber; and the at least three locking mechanisms do not hold immobile the at least three legs with respect to the housing.

14. The platform of claim 8 wherein:

the one leg of the fourth group applies a second force to the one locking mechanism of the second group; and responsive to the second force, the one locking mechanism of the second group applies the force on the incompressible material.

15. A platform for self-stabilizing, the platform comprising:

a housing;

a chamber having at least two openings and an internal volume;

an incompressible material positioned in the internal volume of the chamber, the chamber encloses the incompressible material whereby the incompressible material cannot exit the chamber;

at least two locking mechanisms, one locking mechanism for each opening of the chamber, each locking mechanism movably positioned in a respective opening of the chamber, each locking mechanism adapted to extend a first distance into the internal volume of the chamber while in a disengaged position, each locking mechanism adapted to extend a second distance into the internal volume of the chamber while in an engaged position, the second distance greater than the first distance, all locking mechanisms but one locking mechanism belong to a first group, the one locking mechanism belongs to a second group;

at least two legs, one leg for each locking mechanism, each leg movably coupled to the housing, all legs but one leg belong to a third group, the one leg belongs to a fourth group, each leg of the third group configured to cooperate with one locking mechanism respectively of the first group, the one leg of the fourth group configured to cooperate with the one locking mechanism of the second group; wherein:

the one leg of the fourth group contacts a ground after all of the legs of the third group contact the ground and while all of the at least two legs remain in contact with the ground:

(1) each locking mechanism of the first group respectively extends the second distance into the internal volume of the chamber whereby the locking mechanisms of the first group reduce the internal volume that can be occupied by the incompressible material;

(2) the one locking mechanism of the second group extends a third distance into the chamber;

(3) the third distance is greater than the first distance but is less than the second distance;

(4) the one locking mechanism of the second group further reduces the internal volume of the chamber that can be occupied by the incompressible material whereby the at least two locking mechanisms and the incompressible material fill the internal volume of the chamber;

(5) the one locking mechanism of the second group applies a force on the incompressible material;

(6) the incompressible material transfers the force to the locking mechanisms of the first group;

(7) the force presses the locking mechanisms of the first group against the legs of the third group respectively to hold immobile the legs of the third group with respect to the housing; and (8) the one locking mechanism of the second group does not hold immobile the one leg of the fourth group with respect to the housing.

16. The platform of claim 15 wherein the incompressible material cannot exit the internal volume of the chamber via any of the at least two openings.

17. The platform of claim 15 wherein a volume of the incompressible material is less than the internal volume of the chamber.

18. The platform of claim 15 wherein, while the at least two legs do not contact the ground, a sum of a first volume of the incompressible material and a second volume of the at least two locking mechanisms positioned inside the internal volume of the chamber is less than the internal volume of the chamber.

19. The platform of claim 15 wherein, while the at least two legs all contact the ground, a sum of a first volume of the incompressible material and a second volume of the at least two locking mechanisms positioned inside the internal volume of the chamber is equal to the internal volume of the chamber.

20. The platform of claim 15 wherein, a portion of the at least two locking mechanisms respectively remains outside of the chamber while the at least two locking mechanisms are positioned in either the disengaged position or the engaged position.

\* \* \* \* \*